United States Patent
Ratnakaram et al.

(10) Patent No.: US 11,354,640 B2
(45) Date of Patent: Jun. 7, 2022

(54) DYNAMICALLY AUTHORIZING AND PROCESSING CONTACTLESS EVENTS

(71) Applicant: Bank of America Corporation, Charlotte, NC (US)

(72) Inventors: Udaya Kumar Raju Ratnakaram, Hyderabad (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 75 days.

(21) Appl. No.: 16/921,044

(22) Filed: Jul. 6, 2020

(65) Prior Publication Data

US 2022/0005014 A1    Jan. 6, 2022

(51) Int. Cl.
*G06Q 20/20* (2012.01)
*G06Q 20/18* (2012.01)
(Continued)

(52) U.S. Cl.
CPC ......... *G06Q 20/204* (2013.01); *G06F 3/0482* (2013.01); *G06K 19/06196* (2013.01); *G06Q 20/1085* (2013.01); *G06Q 20/18* (2013.01); *G06Q 20/206* (2013.01); *G06Q 20/341* (2013.01); *G06Q 20/352* (2013.01);
(Continued)

(58) Field of Classification Search
CPC .. G06Q 20/204; G06Q 20/1085; G06Q 20/18; G06Q 20/206; G06Q 20/341; G06Q 20/352; G06Q 20/4014; G06Q 40/02; G06F 3/0482; G06F 21/31; G06K 19/06196
See application file for complete search history.

(56) References Cited

U.S. PATENT DOCUMENTS 5,590,038 A * 12/1996 Pitroda .............. G06Q 20/4093
705/41
5,796,832 A * 8/1998 Kawan ................ G06Q 20/105
705/72
(Continued)

FOREIGN PATENT DOCUMENTS

CA    3010055 A1 * 12/2018    ......... G06Q 20/1085
EP    0980053 A2 *  8/1999
(Continued)

OTHER PUBLICATIONS

"AGS Transact Technologies Introduces 'Touchless' Solution For Cash Withdrawals at ATMs." Business world (India) (2020): n. pag. Print. (Year: 2020).*
(Continued)

*Primary Examiner* — Ashford S Hayles
(74) *Attorney, Agent, or Firm* — Banner & Witcoff, Ltd.

(57) ABSTRACT

Systems for contactless authentication and event processing are provided. In some examples, functionality of a self-service kiosk may be requested. In response, a user may be authenticated and a first interactive user interface may be generated and displayed by the self-service kiosk. A second, different interactive user interface may be generated and transmitted for display by an event processing device. A user may select an option displayed by the event processing device. The user selection may be made via the second interactive user interface. The user selection may then cause the self-service kiosk to execute the selected function.

23 Claims, 11 Drawing Sheets

(51) Int. Cl.
| | |
|---|---|
| *G06Q 20/10* | (2012.01) |
| *G06Q 20/34* | (2012.01) |
| *G06Q 20/40* | (2012.01) |
| *G06K 19/06* | (2006.01) |
| *G06F 3/0482* | (2013.01) |
| *G06Q 40/02* | (2012.01) |
| *G06F 21/31* | (2013.01) |

(52) U.S. Cl.
CPC ......... *G06Q 20/4014* (2013.01); *G06Q 40/02* (2013.01); *G06F 21/31* (2013.01)

(56) References Cited

U.S. PATENT DOCUMENTS

| | | | | |
|---|---|---|---|---|
| 5,884,271 | A * | 3/1999 | Pitroda | G06Q 20/105 705/41 |
| 5,917,913 | A * | 6/1999 | Wang | G07F 19/20 380/30 |
| 6,081,791 | A * | 6/2000 | Clark | G06Q 20/1085 705/43 |
| 6,595,342 | B1 * | 7/2003 | Maritzen | G06Q 20/40145 194/906 |
| 7,493,497 | B1 * | 2/2009 | Tan, Jr. | G06F 21/73 713/193 |
| 7,946,477 | B1 * | 5/2011 | Ramachandran | G06K 7/0004 235/492 |
| 7,992,778 | B1 | 8/2011 | Ramachandran et al. | |
| 8,146,802 | B1 * | 4/2012 | Ramachandran | G06Q 20/3227 705/40 |
| 8,276,823 | B2 * | 10/2012 | Chen | G06K 19/077 235/488 |
| 8,820,638 | B1 * | 9/2014 | Cotter | G06Q 40/02 235/382 |
| 9,033,221 | B1 | 5/2015 | Ramachandran et al. | |
| 9,098,846 | B2 * | 8/2015 | Gill | G06Q 20/322 |
| 10,339,530 | B1 * | 7/2019 | Goodsitt | G06Q 20/409 |
| 10,706,400 | B1 * | 7/2020 | Puffer | G06Q 20/38215 |
| 2004/0098740 | A1 * | 5/2004 | Maritzen | H04N 21/441 725/50 |
| 2010/0057612 | A1 * | 3/2010 | Wagenhals | G06Q 20/102 705/40 |
| 2013/0065564 | A1 * | 3/2013 | Conner | G06K 19/07354 340/5.82 |
| 2013/0124409 | A1 * | 5/2013 | Healy | G06Q 20/28 705/43 |
| 2014/0122267 | A1 * | 5/2014 | Tayebi | G06Q 20/3674 705/17 |
| 2014/0138435 | A1 * | 5/2014 | Khalid | G06Q 20/227 235/380 |
| 2014/0226275 | A1 * | 8/2014 | Ko | G06F 1/1681 361/679.27 |
| 2014/0339315 | A1 * | 11/2014 | Ko | G06F 1/1628 235/492 |
| 2015/0069126 | A1 * | 3/2015 | Leon | G06K 19/06206 235/492 |
| 2016/0044442 | A1 * | 2/2016 | Pacelli | G06Q 20/3224 455/41.1 |
| 2016/0085325 | A1 * | 3/2016 | Lee | G06F 1/1641 345/173 |
| 2016/0086143 | A1 * | 3/2016 | Hao | G06Q 20/4097 705/43 |
| 2016/0171361 | A1 * | 6/2016 | Chatterton | G06K 7/087 705/41 |
| 2017/0344965 | A1 * | 11/2017 | Watson | G06Q 20/3224 |
| 2017/0357979 | A1 * | 12/2017 | Khurana | H04L 63/102 |
| 2018/0060866 | A1 * | 3/2018 | Kurian | G06Q 20/4018 |
| 2018/0063125 | A1 * | 3/2018 | Bryant | H04W 12/068 |
| 2018/0114222 | A1 * | 4/2018 | Furey | G06Q 20/3224 |
| 2018/0225459 | A1 * | 8/2018 | Zarakas | G06K 19/07381 |
| 2019/0073663 | A1 * | 3/2019 | Jamkhedkar | G06Q 20/1085 |
| 2019/0108731 | A1 * | 4/2019 | Hazard | G07F 19/206 |
| 2019/0347643 | A1 * | 11/2019 | Skelsey | G06Q 20/327 |
| 2020/0005279 | A1 * | 1/2020 | Raquepaw | G06Q 20/3821 |
| 2020/0090151 | A1 * | 3/2020 | Francis | H04L 67/22 |
| 2020/0221255 | A1 * | 7/2020 | Dadhaniya | H04W 4/024 |
| 2020/0286086 | A1 * | 9/2020 | Chanduri | G06Q 20/3827 |
| 2021/0049583 | A1 * | 2/2021 | Wurmfeld | G06Q 20/3276 |
| 2021/0272097 | A1 * | 9/2021 | Wen | H04L 9/3271 |
| 2021/0334779 | A1 * | 10/2021 | Goodwin, III | G06Q 20/405 |
| 2021/0357906 | A1 * | 11/2021 | McGraw, IV | G06Q 20/325 |
| 2021/0357921 | A1 * | 11/2021 | Vargas | G06Q 20/385 |

FOREIGN PATENT DOCUMENTS

| | | | | |
|---|---|---|---|---|
| KR | 100389229 | B1 * | 9/1996 | |
| KR | 100389229 | B1 * | 11/2003 | G07F 19/20 |
| KR | 20090133056 | A * | 9/2008 | |

OTHER PUBLICATIONS

Kiosks the New Frontier for Payment Cards. London: VRL KnowledgeBank, 2006. Print. (Year: 2006).*

Yeow, Paul H.P, and W.H Loo. "Acceptability of ATM and Transit Applications Embedded in Multipurpose Smart Identity Card: An Exploratory Study in Malaysia." International journal of electronic government research 5.2 (2009): 37-56. Web. (Year: 2009).*

Claude Solnik. "Bank of America Links ATMs to Smart Phones." Long Island business news (2016): n. pag. Print. (Year: 2016).*

Subramanian, S. Anantha et al. "ATM Access Control Using VLC." AIP Conference Proceedings. vol. 2222. N.p., 2020. Web. (Year: 2020).*

Meschtscherjakov, Alexander et al. "Co-Designing for NFC and ATMs: An Inspirational Bits Approach." Proceedings of the 15th International Conference on Human-Computer Interaction with Mobile Devices and Services. ACM, 2013. 422-427. Web. (Year: 2013).*

"Guidelines for Contactless ATM Transactions—A Guide for ATM Owners and Operators", US Payments Forum, Version 2.0, Jul. 2019, downloaded from <https://www.uspaymentsforum.org/wp-content/uploads/2019/08/Contactless-ATM-Guidelines-FinalV2-July-2019.pdf> on Jul. 6, 2020.

* cited by examiner

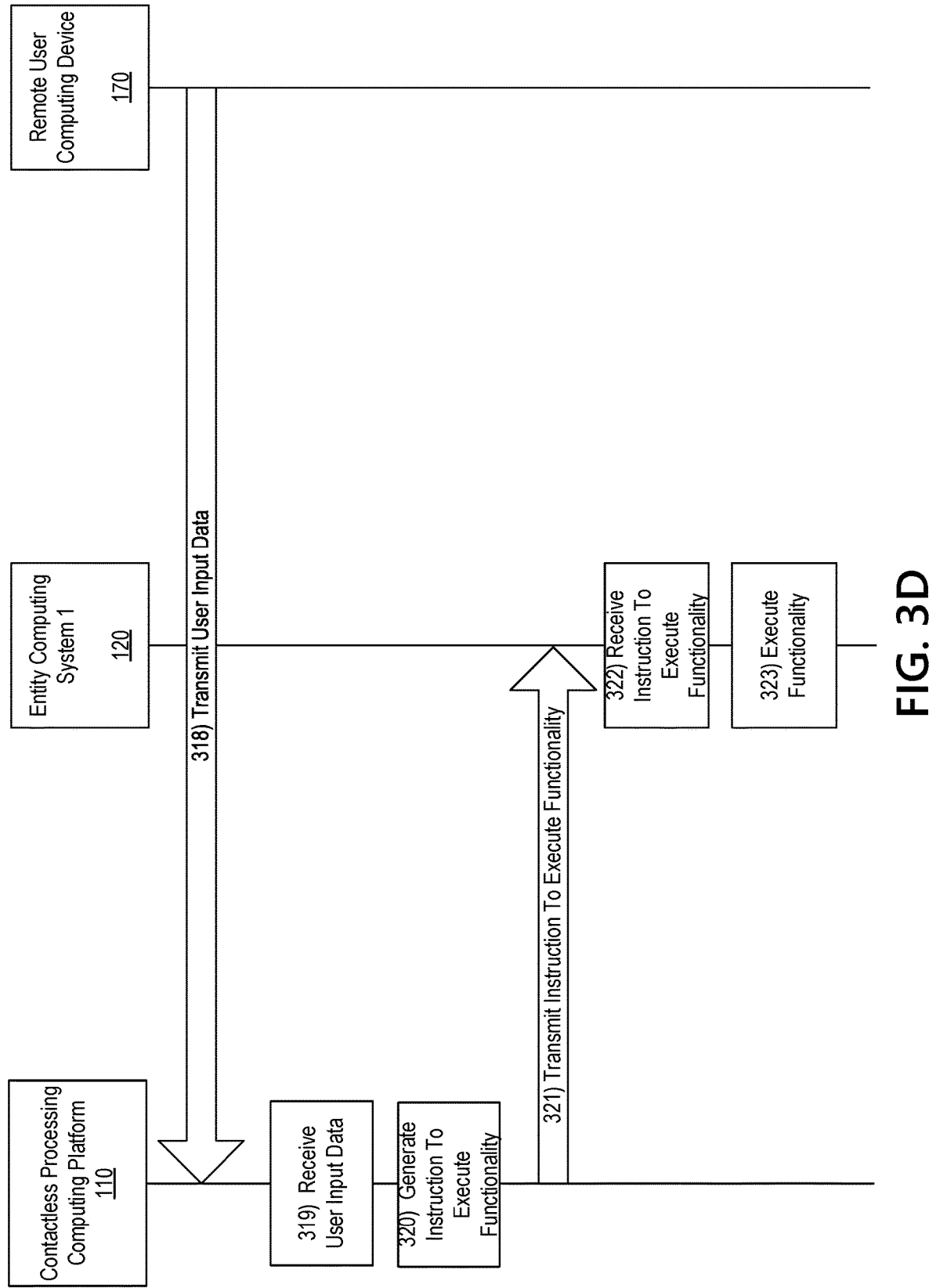

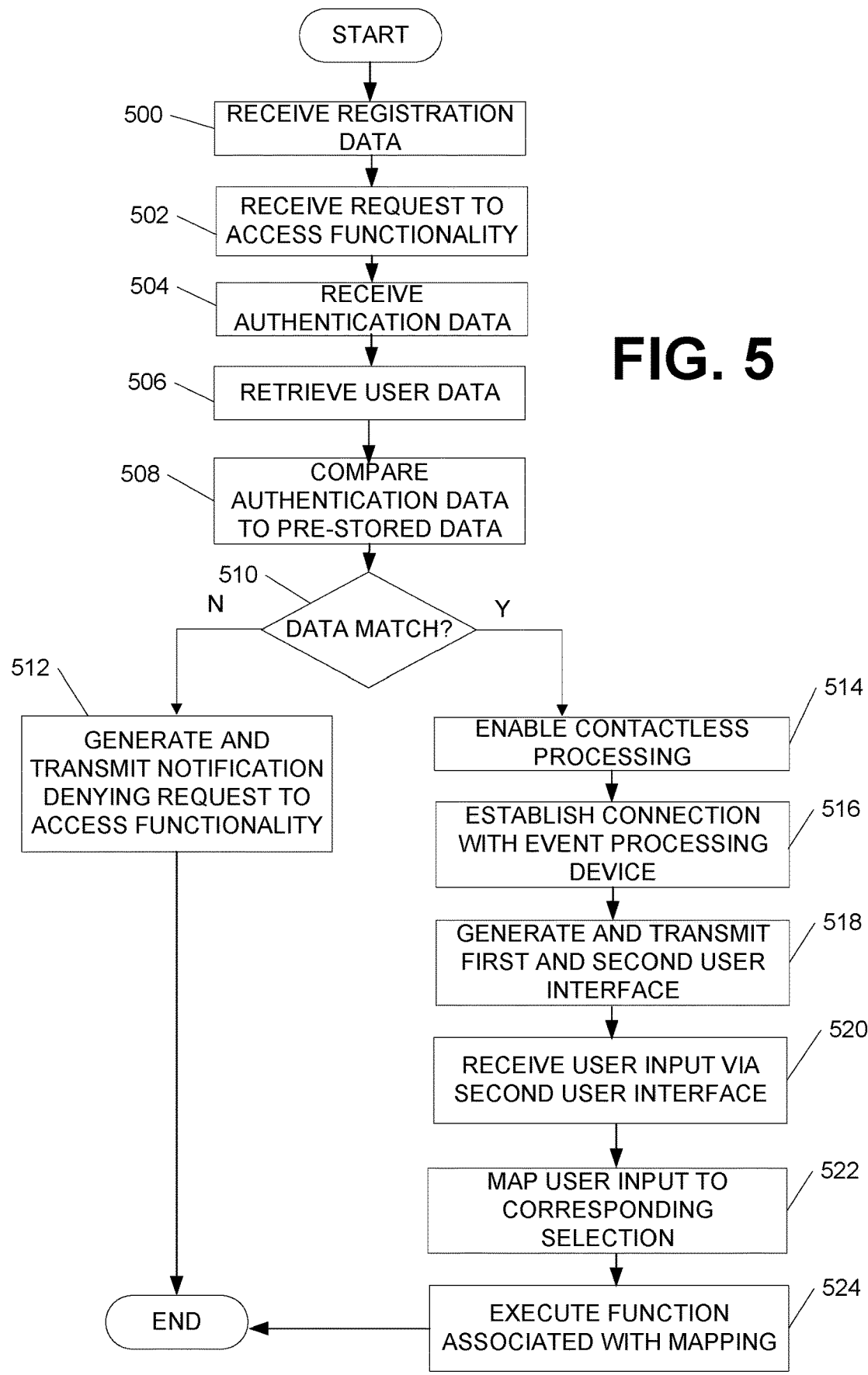

DYNAMICALLY AUTHORIZING AND PROCESSING CONTACTLESS EVENTS

BACKGROUND

Aspects of the disclosure relate to electrical computers, systems, and devices performing contactless transaction processing.

As customers become more aware of hygiene issues as they go about their daily routines, many customers want to avoid touching surfaces in public areas as much as possible. Accordingly, processing events while minimizing or eliminating contact with common surfaces is important. However, when dealing with self-service kiosks, such as an automated teller machine (ATM), automated transaction assistant (ATA), and the like, it may be difficult to request, execute, and/or process events without touching one or more surfaces, such as a common touchscreen, keypad, or the like. Arrangements discussed herein are directed to reducing or eliminating the need to contact one or more surfaces in requesting or processing an event at a self-service kiosk.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated executing functionality at a self-service kiosk while minimizing or eliminating user contact with the self-service kiosk.

In some examples, functionality of a self-service kiosk may be requested. In response, a user may be authenticated and a first interactive user interface may be generated and displayed by the self-service kiosk. A second, different interactive user interface may be generated and transmitted for display by an event processing device. A user may select an option displayed by the event processing device. The user selection may be made via the second interactive user interface. The user selection may then cause the self-service kiosk to execute the selected function.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3D depict an illustrative event sequence for implementing contactless processing functions in accordance with one or more aspects described herein;

FIG. 5 depicts an illustrative method for implementing and using contactless processing functions according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, reducing or eliminating contact with common or public surfaces is an important consideration as people continue to focus on hygiene. However, when processing events at a self-service kiosk, such as an automated teller machine (ATM), automated teller assistant (ATA), or the like, it is often necessary, in conventional systems, to contact a touchscreen, keypad, or the like. Accordingly, arrangements described herein may reduce or eliminate the need to contact common surfaces on, for example, a self-service kiosk.

In some examples, a user may request functionality at a self-service kiosk. For instance, a user may wave his or her event processing device (such as a debit card, credit card, ATM card, or the like) near the self-service kiosk or a sensor therein such that the event processing device may be detected by the self-service kiosk. Based on detecting the event processing device, user data may be retrieved (e.g., from a database) and the user may be authenticated. In response to authenticating the user, a first interactive user interface may be displayed on a display of the self-service kiosk. The first user interface may include a plurality of selectable options, each option having a corresponding selection character.

Further, a second interactive user interface may be generated and displayed on a digital display of the event processing device. The second interactive user interface may be displayed on a touch sensitive display and may include each of the selection characters shown in the first interactive user interface. Accordingly, a user may make a selection of functionality provided by the self-service kiosk by selecting (e.g., via touch) one selection character on the event processing device. The selected function may then be executed by the self-service kiosk. Accordingly, a user may contact his or her personal event processing device, rather than the common surfaces of the self-service kiosk, to select a function.

These and various other arrangements will be discussed more fully below.

Figure 1A:
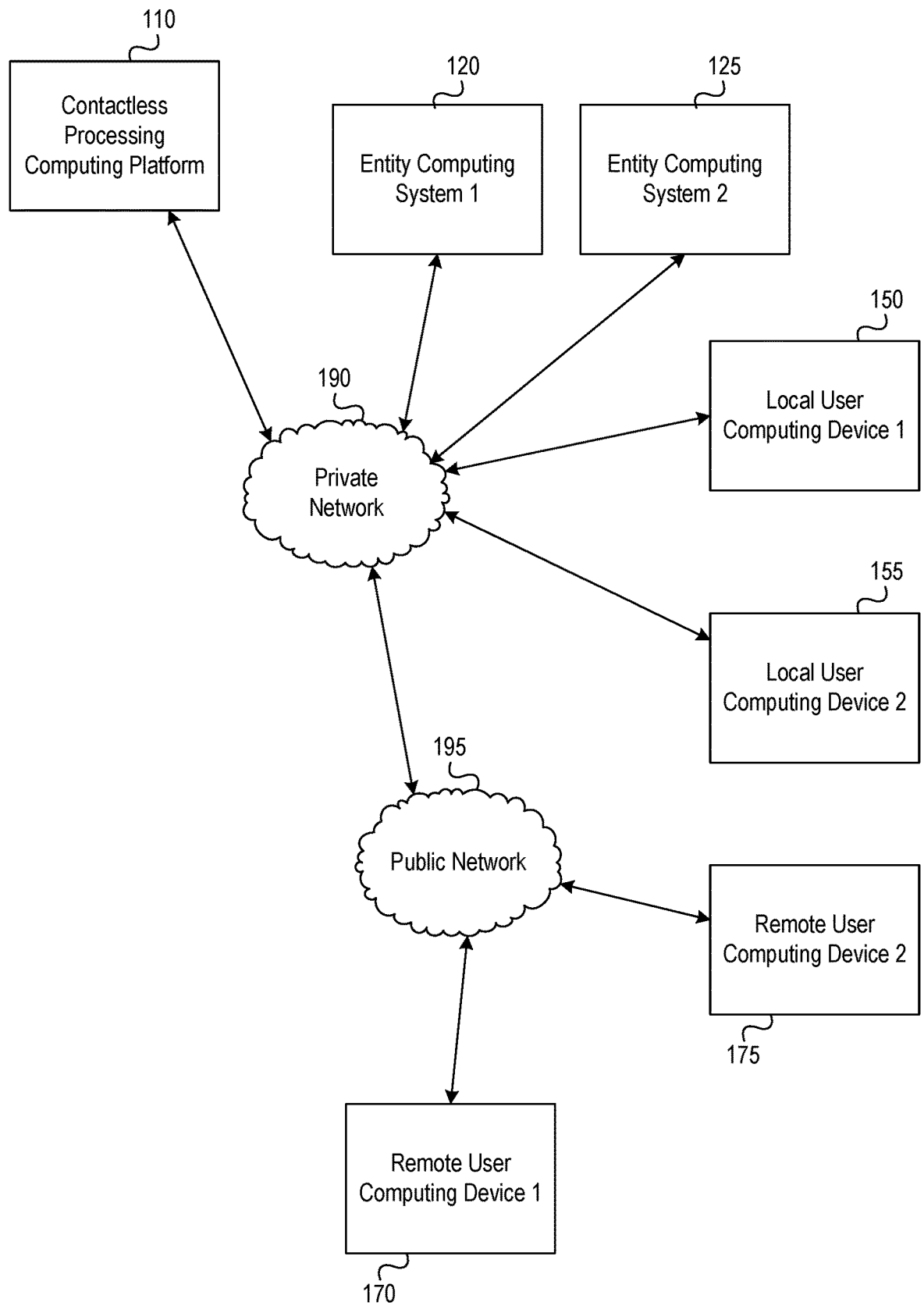
FIGS. 1A and 1B depict an illustrative computing environment for implementing contactless processing functions in accordance with one or more aspects described herein.
Figure 1B:
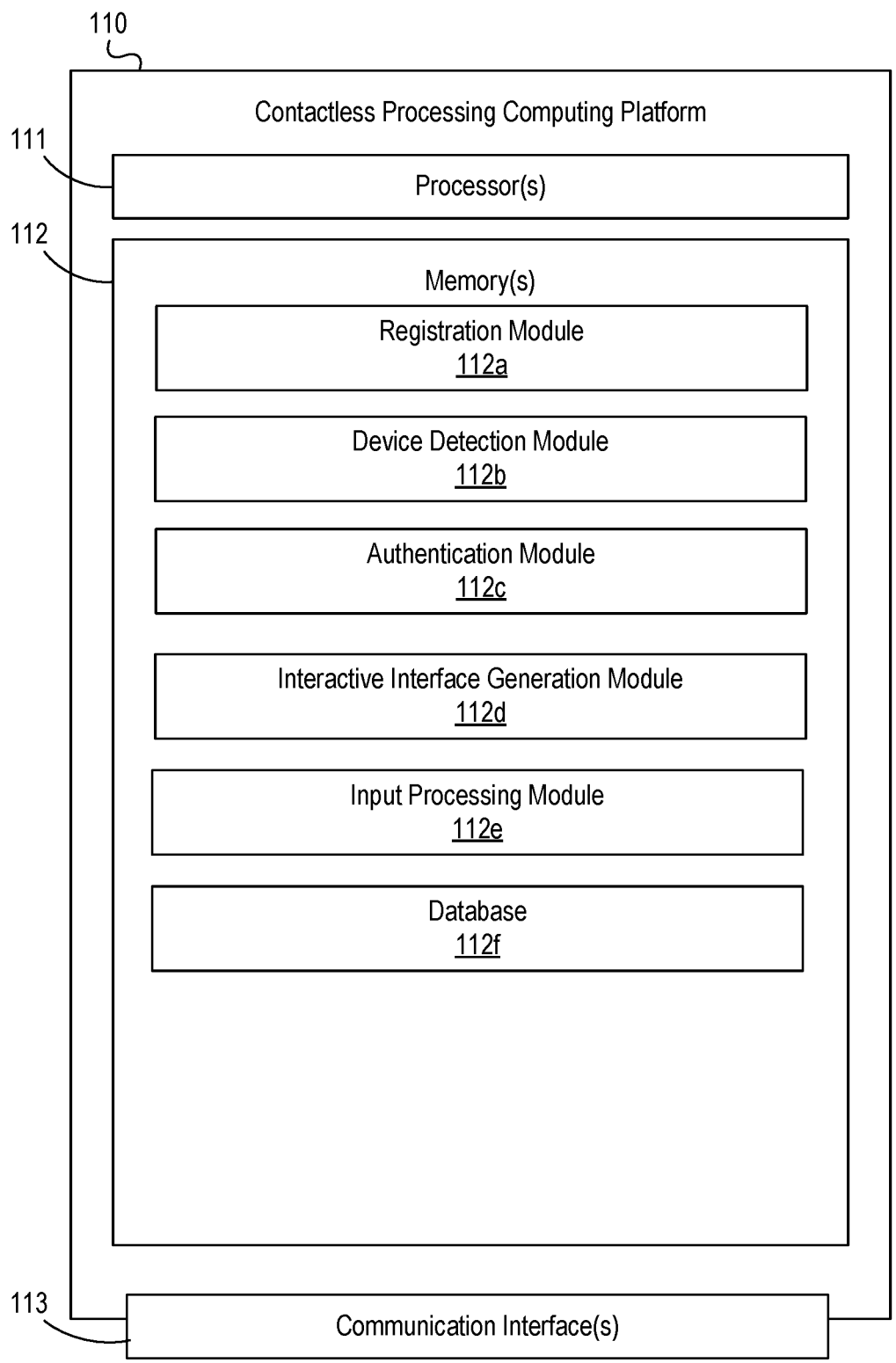

FIGS. 1A-1B depict an illustrative computing environment for implementing and using a system for contactless processing in accordance with one or more aspects described herein. Referring to FIG. 1A, computing environment 100 may include one or more computing devices and/or other computing systems. For example, computing environment 100 may include contactless processing computing platform 110, entity computing system 1 120, entity computing system 2 125, a first local user computing device 150, a second local user computing device 155, a first remote user computing device 170, and a second remote user computing device 175. Although two entity computing systems 120, 125, two local user computing devices 150, 155, and two remote user computing device 170, 175 are shown, more or fewer devices may be used without departing from the invention.

Further, while FIG. 1A illustrates the devices schematically as being separate devices, one or more systems or devices may be in a same physical device and/or one or more devices may be connected to or otherwise in communication with other devices. For instance, entity computing system 1 120 and/or entity computing system 2 125 may be a self-service kiosk, such as an automated teller machine (ATM), automated teller assistant (ATA), or the like. The self-service kiosk may be configured to provide one or more financial or banking functions, customer service functions, or the like. In some examples, the contactless processing computing platform 110 may be a part of (e.g., a same physical device) one or more of the entity computing system 1 120 and/or entity computing system 2 125, or may be a separate device in communication with one or more of entity computing system 1 120, entity computing system 2 125, or various other computing devices, as will be discussed herein.

Contactless processing computing platform 110 may be configured to provide intelligent, dynamic, contactless event processing functions. For instance, contactless processing computing platform 110 may enable or provide (e.g., execute or cause to execute) one or more functions of a device, such as a self-service kiosk, while minimizing or eliminating a user's contact (e.g., physical contact via touching a screen or keypad) with the self-service kiosk. For instance, a user may approach a self-service kiosk and request functionality and/or authentication. For instance, in an example in which entity computing system 1 120 is a self-service kiosk, a user may approach the kiosk and may, in some examples, wave an event processing device, such as a debit card, credit card, ATM card, or the like, near the self-service kiosk. Based on near-field communication, Bluetooth™, or other signal detection technology, the self-service kiosk may detect the user and may activate and begin a process for providing functionality. Additionally or alternatively, the self-service kiosk may continuously or on a periodic basis scan for signals emitted from known devices, such as a pre-registered user device (e.g., smart phone, wearable device, tablet, or the like) and may activate upon detecting a signal. Further, a user may insert or swipe his or her card into the self-service kiosk in order to activate the self-service kiosk.

In some examples, authentication information may be requested from a user. In some examples, this may include transmitting a request for data to a pre-registered mobile device of the user (e.g., request for user input including password, personal identification number (PIN), or the like). Additionally or alternatively, the user may be authenticated based on detection of a signal emitted from a pre-registered user device. Further, the self-service kiosk may request user input including a PIN to the self-service kiosk.

The authentication information may be evaluated by, for example, contactless processing computing platform 110 to determine whether the user is authenticated (e.g., whether data matches pre-stored data). If so, the user may be authenticated and the contactless processing computing platform 110 may generate one or more interactive user interfaces. The user interfaces may be transmitted to the self-service kiosk and a user computing device, which may include an event processing device, such as a credit card, debit card, ATM card, or the like configured as described herein. The user interfaces may be displayed on the respective devices (e.g., on the self-service kiosk, on the event processing device via a digital display configured thereon).

In some examples, a first interactive user interface may be generated and transmitted to the self-service kiosk. The first interactive user interface may include one or more functionality options for selection (e.g., withdrawal of a predetermined amount, request for additional options, or the like). Each selectable option on the first interactive user interface may have a corresponding selection character (e.g., letter, number, or the like).

A second interactive user interface may be generated and transmitted to the event processing device. The second interactive user interface may be displayed via a digital display of the event processing device and may include a plurality of selection characters. Selection of one character of the plurality of selection characters may be transmitted to the contactless processing computing platform 110 and may cause execution of the selected function by, for example, the self-service kiosk. For instance, if the first user interface includes an option to withdraw $100 and the letter "B" is associated with that function, selection of the letter "B" via the second user interface may cause execution of the withdrawal function and $100 may be dispensed from the self-service kiosk.

Entity computing system 1 120 and entity computing system 2 125 may be computing devices associated with the entity or enterprise organization implementing the contactless processing computing platform 110. As discussed above, one or more of entity computing system 1 120, entity computing system 2 125, or the like, may be or include a self-service kiosk providing various functions to a user. As also discussed above, one or more of entity computing system 1 120 and/or entity computing system 2 125 may include contactless processing computing platform 110.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the contactless processing computing platform 110, entity computing system 1 120, entity computing system 2 125, or the like to control parameters associated with the devices or systems, update or execute rules, modify settings and the like.

The remote user computing device 170 and remote user computing device 175 may be used to communicate with, for example, one or more systems, computing platforms, devices, or the like, to enable functionality associated with an entity computing system, authenticate a user, select functionality provided by the self-service kiosk, or the like. As discussed herein, remote user computing device 170 and/or remote user computing device 175 may be or include an event processing device, such as a credit card, debit card, or the like. For instance, one or more of remote user computing device 170 and/or remote user computing device 175 may be or include a device such as device 270 shown in FIGS. 2A and 2B, as will be discussed more fully below.

Figure 2A:
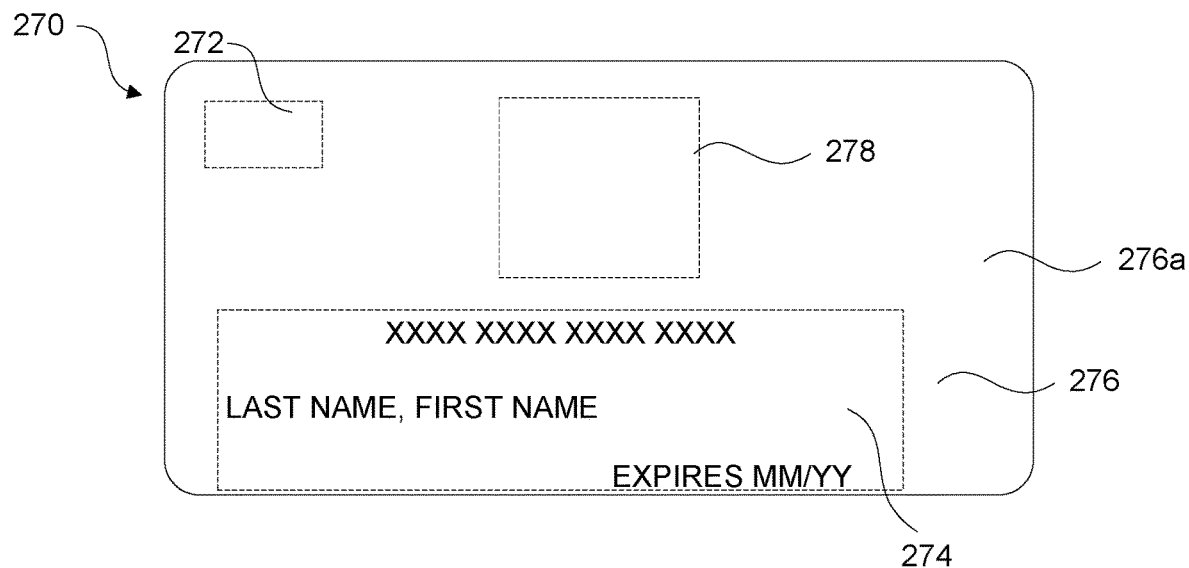
FIGS. 2A and 2B illustrate an example event processing device that may be used with contactless processing in accordance with one or more aspects described herein.
Figure 2B:
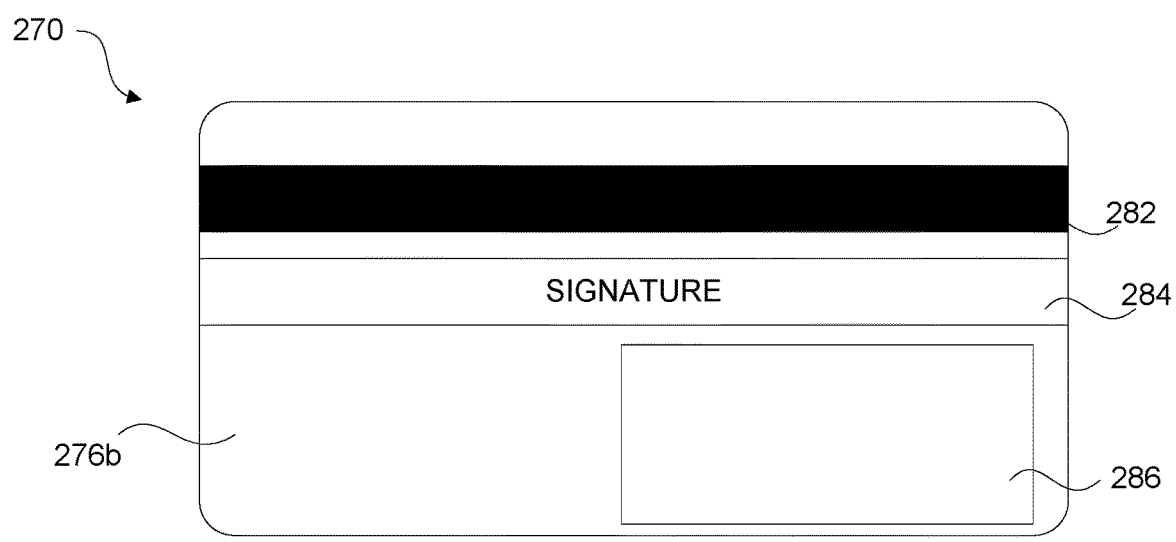

Remote user computing device 170 and/or remote user computing device 175 may also include user devices such as smartphones, tablets, wearable devices, and the like. In some examples, remote user computing device 170 may be or include an event processing device as shown in FIGS. 2A and 2B, while remote user computing device 175 may be another type of user device, such as a smartphone, wearable device, or the like.

Computing environment 100 also may include one or more computing platforms. For example, and as noted above, computing environment 100 may include contactless processing computing platform 110. As illustrated in greater detail below, contactless processing computing platform 110 may include one or more computing devices configured to perform one or more of the functions described herein. For example, contactless processing computing platform 110 may include one or more computers (e.g., laptop computers, desktop computers, servers, server blades, or the like).

As mentioned above, computing environment 100 also may include one or more networks, which may interconnect one or more of contactless processing computing platform 110, entity computing system 1 120, entity computing system 2 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, contactless processing computing platform 110, entity computing system 1 120, entity computing system 2 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect contactless processing computing platform 110, entity computing system 1 120, entity computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., contactless processing computing platform 110, entity computing system 1 120, entity computing system 2 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., contactless processing computing platform 110, entity computing system 1 120, entity computing system 2 125, local user computing device 150, local user computing device 155). In some examples, remote user computing device 170 may be, for example, an event processing or other device issued by the entity or enterprise organization operating the private network and may, in some examples, connect via either network 190 or network 195.

Referring to FIG. 1B, contactless processing computing platform 110 may include one or more processors 111, memory 112, and communication interface 113. A data bus may interconnect processor(s) 111, memory 112, and communication interface 113. Communication interface 113 may be a network interface configured to support communication between contactless processing computing platform 110 and one or more networks (e.g., private network 190, public network 195, or the like). Memory 112 may include one or more program modules having instructions that when executed by processor(s) 111 cause contactless processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of contactless processing computing platform 110 and/or by different computing devices that may form and/or otherwise make up contactless processing computing platform 110.

For example, memory 112 may have, store and/or include a registration module 112a. Registration module 112a may store instructions and/or data that may cause or enable the contactless processing computing platform 110 to receive data related to one or more users and/or user devices, accounts or the like. In some examples, registration module 112a may receive other registration data such as user options to enable contactless processing. In some arrangements, authentication data (e.g., biometric data, device data, username and password data, PIN, or the like) may be provided via the registration module 112a and pre-stored for later comparison to received authentication data. The registration module 112a may, upon receiving registration data, modify a database to store the registration data in a new entry. In some examples, registration module 112a may, with permission of the user, retrieve data related to the user from one or more other entity devices or systems (e.g., pre-stored account data, authentication data, or the like).

Contactless processing computing platform 110 may further have, store and/or include device detection module 112b. Device detection module 112b may detect a user computing device, such as remote user computing device 170, and enable or activate functionality of a self-service kiosk, such as entity computing system 1 120, in response to detecting the device. For instance, the entity computing system 1 120 may scan (e.g., continuously or on a periodic basis) and/or based on instructions from the contactless processing computing platform 110, for signals emitted from one or more devices. Upon detecting a signal, signal data may be transmitted to the contactless processing computing platform 110 device detection module 112b to evaluate the signal to determine whether it is associated with a pre-registered device, whether functionality should be activated or enabled, or the like. In some examples, device detection module 112b may detect a chip in an event processing device detected within proximity of the self-service kiosk using, for example, near-field communication, Bluetooth™, or the like. In some examples, detection of a device may prompt contactless processing computing platform 110 to identify a user associated with the detected device and retrieve user data, such as authentication information, account information, and the like.

Contactless processing computing platform 110 may further have, store and/or include authentication module 112c. Authentication module 112c may store instructions and/or data that may cause or enable the contactless computing platform 110 to receive authentication data from a user, compare the authentication data to pre-stored data and authorize authentication of the user or deny authentication of the user, based on the comparing. For instance, authentication module 112c may receive a username and password combination, biometric data, PIN, indication of a detected signal from a device, and the like, and may compare the received data to pre-stored data. Based on the comparing, an authentication output or response may be generated and transmitted to, for instance, external computing system 1 120, causing external computing system 1 120 to enable functionality, activate functionality, or the like.

Contactless processing computing platform 110 may further have, store and/or include interactive interface generation module 112d. Interactive interface generation module 112d may store instructions and/or data that may cause or enable the contactless processing computing platform to generate one or more interactive user interfaces for display on, for example, a self-service kiosk such as entity computing system 1 120, and/or an event processing device, such as remote user computing device 170. As is discussed more fully herein, in some example, a first interactive user interface may be generated and displayed on a display of the self-service kiosk that includes a plurality of selectable options available to a user and a selection character corresponding to each selectable option. A second, different interactive user interface may be generated and transmitted to event processing device for display and may include the selection characters corresponding to each selectable option. A user may select (e.g., by touching or pressing the desired selection character on the event processing device) and option provided by the self-service kiosk.

For instance, user input received via the second interactive user interface of the event processing device may be transmitted to input processing module 112e. Input processing module 112e may store instructions and/or data that may cause or enable the contactless processing computing platform 110 to receive a signal corresponding to the selected input, generate an instruction executing functionality associated with the selected input, and transmit or cause execution of the instruction executing functionality by the self-service kiosk (e.g., entity computing system 1 120). Accordingly, a user may make a selection of an option via his or her own event processing device (e.g. without contact with the self-service kiosk) and the functionality may be provided by the self-service kiosk.

Contactless processing computing platform 110 may further have, store and/or include a database 112f. Database 112f may store data such as pre-stored authentication data, user data, or the like. The data stored in database 112f may be retrieved, for instance, for comparison to received authentication data to authenticate a user.

FIGS. 2A and 2B illustrate one example event processing device 270 that may be used in accordance with one or more aspects described herein. While the event processing device 270 shown illustrates various types of data or features of an example event processing device, more or fewer types of data or features may be provided without departing from the invention.

As shown in FIGS. 2A and 2B, the event processing device 270 may be or include, e.g., remote user computing device 170, remote user computing device 175, or the like. Event processing device 270 may include a generally planar portion 276 having a first side 276a and an opposite second side 276b. FIG. 2A illustrates one example first side 276a and includes account and user region 274 that may include a name of a cardholder, account number, expiration date, or the like. Event processing device 270 may also include a processor 272 that may include an energy source. The processor 272 may be configured to connect to one or more devices, such as entity computing system 1 120 and/or contactless processing computing platform 110, process one or more events or transactions via the event processing device 270, or the like. The processor 272 may be arranged on one side of the device or arranged between the first side 276a and the second side 276b (as shown in FIG. 2A). In some examples, event processing device 270 may include one or more sensors arranged in, for example, sensor region 278. The one or more sensors may include biometric sensors, and the like.

FIG. 2B illustrates one example opposite, second side of event processing device 270. The second side may include a magnetic strip 282 storing data that may be used to process one or more events or transactions via the event processing device 270. In some examples, event processing device 270 may further include a signature area 284 where a user may place his or her signature for additional security.

Event processing device 270 may further include a digital display 286. Digital display 286 is shown on a second side (e.g., rear) of the event processing device 270 but may be arranged on a first side (e.g., front), as desired. The digital display 286 may display one or more interactive user interface that may be received from the contactless processing computing platform 110 and may be used to make selections associated with functionality provided by, for example, a self-service kiosk (e.g., entity computing system 1 120). For example, digital display 286 may be a touch-sensitive display that may generate a signal upon detecting user input touching or selecting one or more options. The signal may be transmitted to contactless processing computing platform 110 and may cause execution of functionality at the self-service kiosk.

FIGS. 3A-3D depict one example illustrative event sequence for implementing and using contactless processing functions in accordance with one or more aspects described herein. The events shown in the illustrative event sequence are merely one example sequence and additional events may be added, or events may be omitted, without departing from the invention.

At step 301, registration data may be received. For instance, a user may transmit a request to register for contactless processing via, for instance, a user computing device (e.g., remote user computing device 175 not shown in FIG. 3A). The request to register may include registration information such as name of user, contact information of user, account information of user, device information of user, authentication information of the user, and the like. In some examples, the registration information may include one or more user preferences (e.g., customized events to use contactless processing, or the like). In some arrangements, the registration information may include user permission for contactless processing computing platform 110 to retrieve user information (e.g., account information, authentication information, or the like) from one or more other entity systems or databases. The request for registration data and associated request to register a user may be performed at a banking center, via an online application, via an application executing on a mobile device, or the like.

At step 302, responsive to receiving the registration data, a registration entry may be generated. For instance, a database may be modified to include an entry associated with the registration request. The entry may include a plurality of data elements associated with the user.

At step 303, a request to access functionality may be received by entity computing system 1 120. As discussed herein, entity computing system 1 120 may include a self-service kiosk, such as an ATM, ATA, or the like, that may be part of or separate from the contactless processing computing platform 110. In some examples, the request to access functionality may include detection of a user device by the entity computing system 1 120. For instance, entity computing system 1 120 may scan (e.g., continuously, on a periodic basis, or the like) for nearby signals (e.g., via near field communication, Bluetooth™, or the like) transmitted from one or more user devices, such as smartphones, wearable devices, and the like. In some examples, detection of a signal may constitute a request to access functionality. Additionally or alternatively, the detected signal may be compared to signals associated with pre-registered devices and, if a match occurs, the match may constitute the request to access functionality.

In some arrangements, a user may request access to functionality by moving in front of a motion sensor associated with entity computing system 1 120, by speaking a request that is captured via a microphone or other audio sensor associated with entity computing system 1 120, or the like.

Additionally or alternatively, a user may insert an event processing device (e.g., debit card, credit card, ATM card, or the like) into entity computing system 1 120 or may wave or pass the processing device near to a sensor associated with entity computing system 1 120, which may constitute a request to access functionality.

At step 304, authentication data may be requested from the user. In some examples, requesting authentication data may include transmitting a request for user authentication data to a preregistered user device, such as a smartphone, wearable device, or the like (e.g., remote user computing device 175). The requested user authentication data may include PIN, biometric data or the like. Additionally or alternatively, the request for authentication data may include a request for user input into the self-service kiosk (e.g., entity computing system 1 120). Various other requests for authentication information may be used without departing from the invention.

For instance, in some examples, detection of a signal emitted from a pre-registered device may constitute authentication of a user. In these examples, step 304 requesting authentication data may be omitted.

At step 305, authentication data may be received by entity computing system 1 120. For instance, the authentication data may be input to the remote user computing device 175 and transmitted to the entity computing system 1 120. In some examples, the user may input the requested authentication data via the user computing device (remote user computing device 175). Additionally or alternatively, the user may input requested authentication data via the entity computing system 1 120. Further, detection of a signal emitted from a preregistered device may constitute authentication data.

Figure 3A:
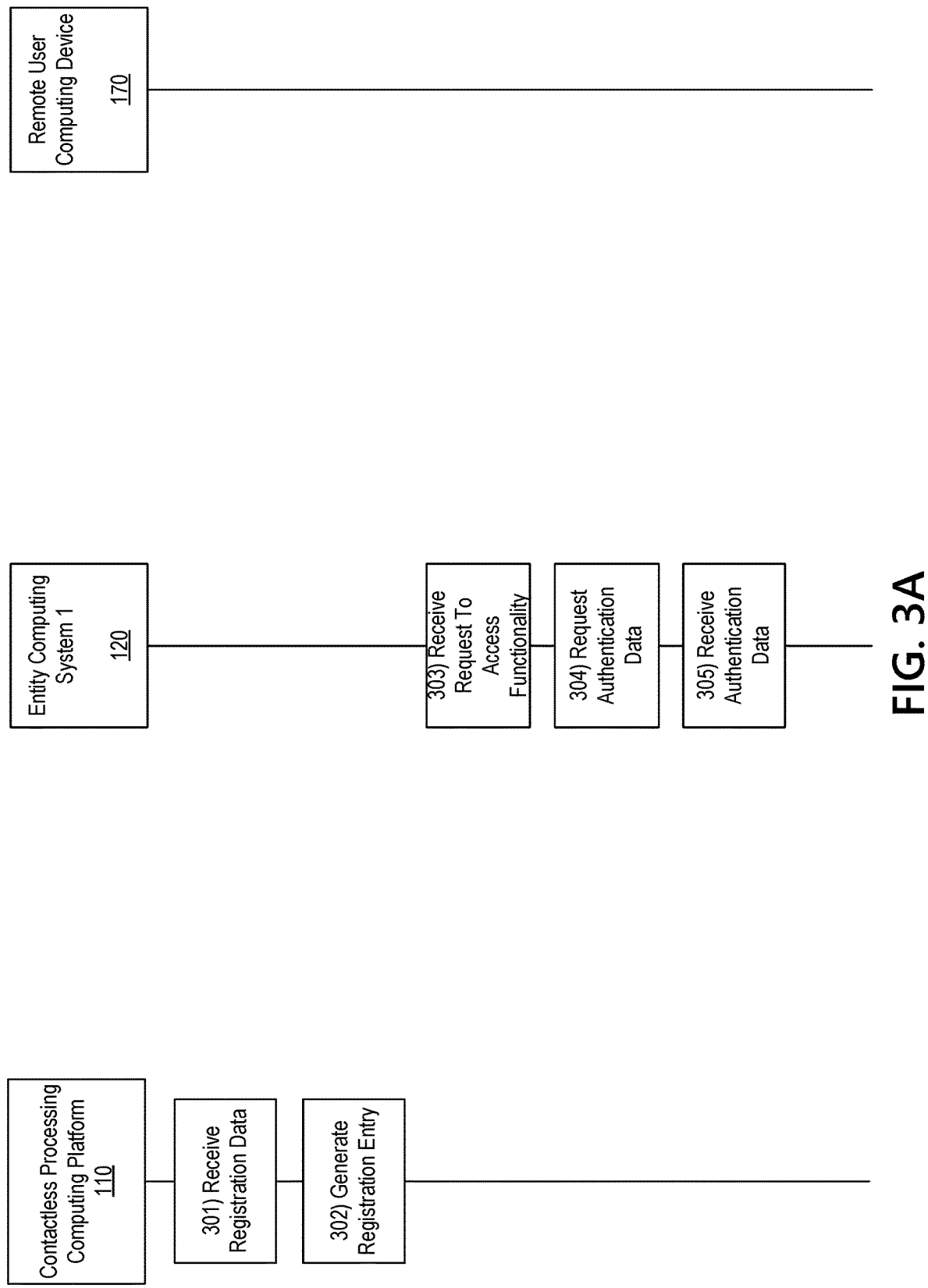
Figure 3B:
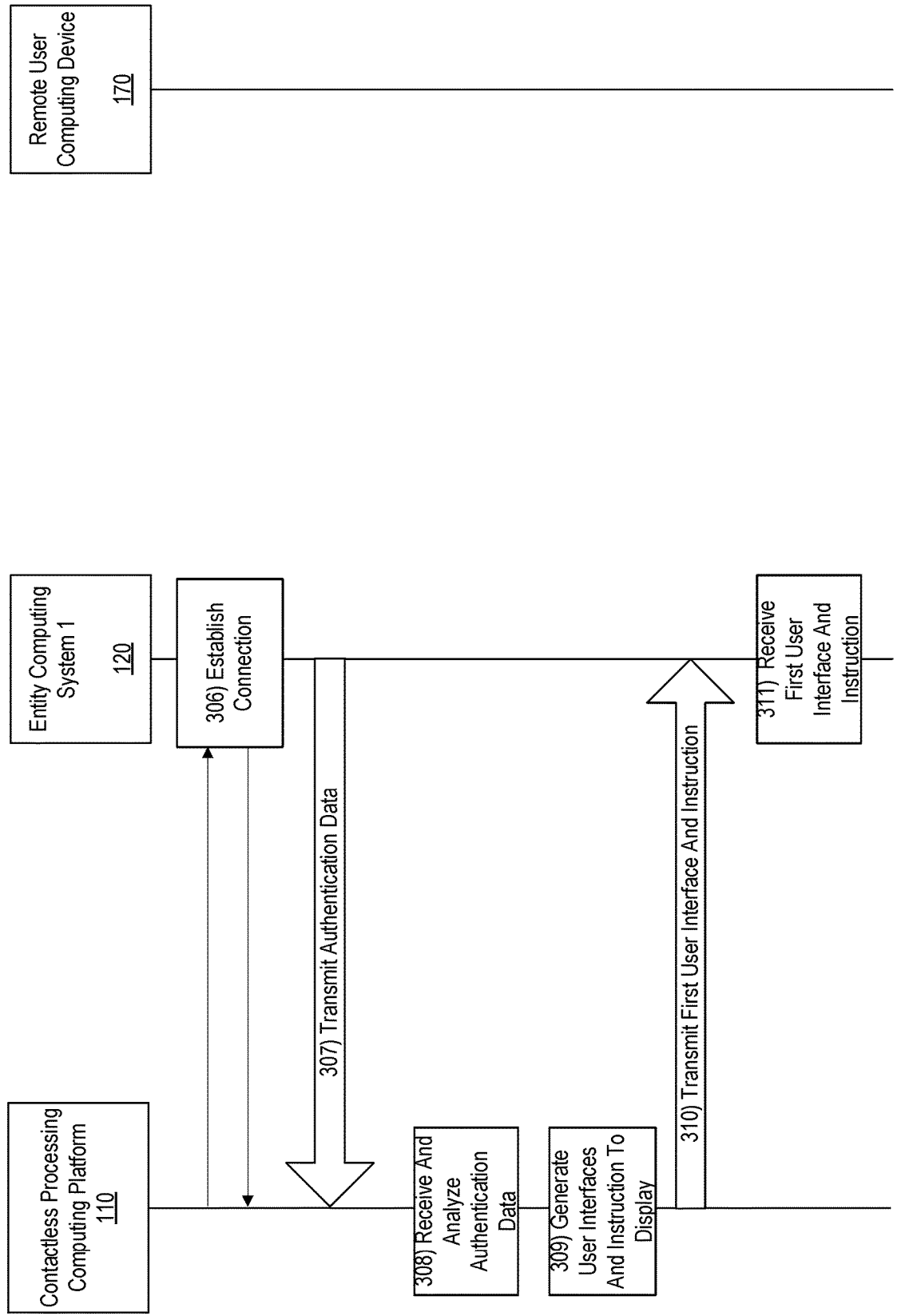

With reference to FIG. 3B, at step 306, a connection may be established between the entity computing system 1 120 and the contactless processing computing platform 110. For instance, a first wireless connection may be established between the contactless processing computing platform 110 and entity computing system 1 120. Upon establishing the first wireless connection, a communication session may be initiated between contactless processing computing platform 110 and entity computing system 1 120.

At step 307, the received authentication data may be transmitted from entity computing system 1 120 to contactless processing computing platform 110. For instance, the received authentication data may be transmitted during the communication session initiated upon establishing the first wireless connection.

At step 308, the authentication data may be received by contactless processing computing platform 110 and analyzed. For instance, pre-stored authentication data associated with a user may be retrieved from, for instance, database 112*f*, and compared to the received authentication data to determine whether a match exists. If so, the user may be authenticated and functionality of the entity computing system 1 120 may be enabled. If not, the request to access functionality may be denied and a notification may be transmitted for display (e.g., via a display of entity computing system 1 120, via remote user computing device 175, or the like).

At step 309, one or more user interfaces and associated instructions or commands for display may be generated. For instance, if a user is authenticated and functionality is enabled or activated for the user, one or more user interfaces may be generated. In some examples, a first user interface may include options for selection available to the user and associated with various functionality of the entity computing system 1 120. For instance, an interactive user interface including a plurality of selectable options, each associated with different functionality provided by entity computing system 1 120, may be generated. In some examples, each selectable option may have a corresponding selection character.

Figure 4A:
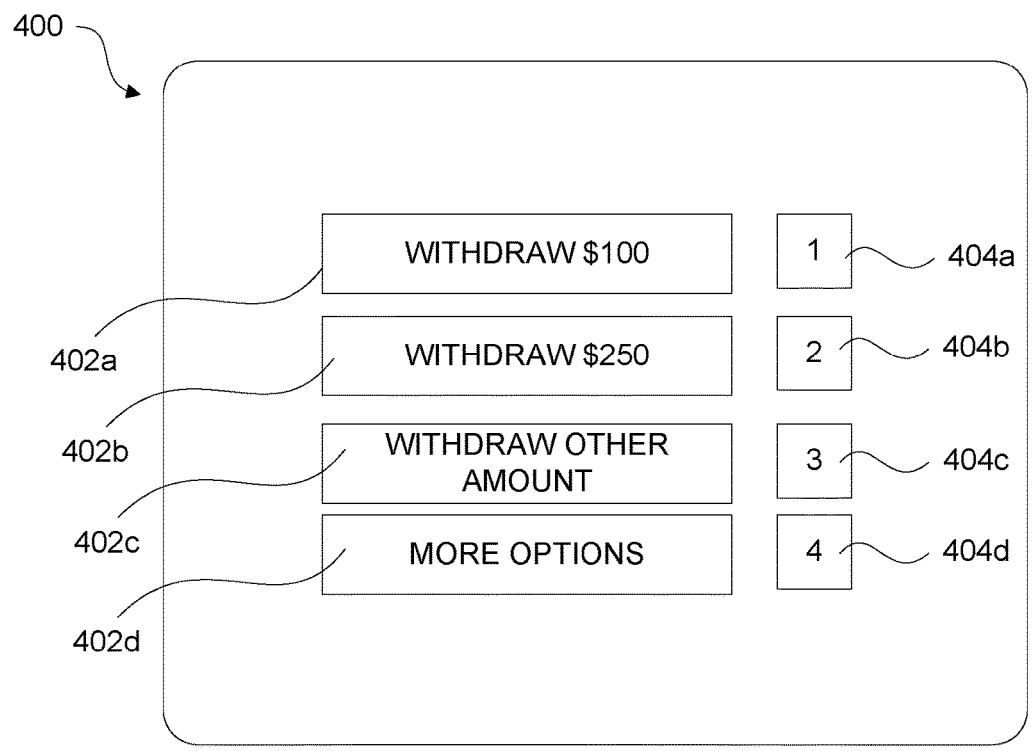
FIGS. 4A and 4B illustrate example interactive user interfaces that may be generated in accordance with one or more aspects described herein.

For instance, FIG. 4A illustrates one example first interactive user interface that may be generated. As shown, interface 400 may include a plurality of selectable options 402*a*-402*d*. For instance, interface 400 may include selectable options associated with different withdrawal amounts, different functionality (e.g., balance check, deposit, or the like), associated with a request for additional options, and the like. The selectable options 402*a*-402*d* shown in the first interactive user interface 400 are merely some examples of selectable options. Additional or other options may be provided without departing from the invention.

Interface 400 further includes selection characters 404*a*-404*d*. Each selection character 404*a*-404*d* may correspond to a selectable option 402*a*-402. The selection characters 404*a*-404*d* shown are merely some examples and various other selection characters may be used without departing from the invention.

With further reference to FIG. 3B, a second interactive user interface may be generated at step 309. For instance, a second interactive user interface may be generated for display on, for example, remote user computing device 170 (e.g., event processing device 270). The second interactive user interface may be compatible with the first interactive user interface in that it may include a display of the selection characters provided in the first interactive user interface.

Figure 4B:
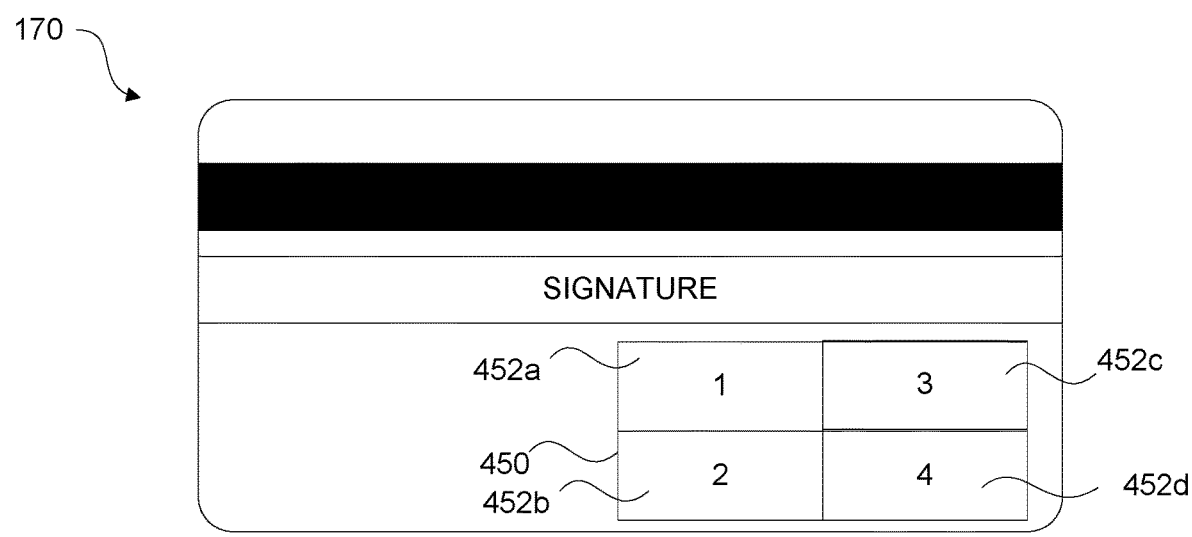

For instance, FIG. 4B illustrates one example second interactive user interface that may be generated. As shown, interface 450 may include selectable regions 452a-452d each having a different selection character 404a-404d associated therewith. For instance, interface 400 may include four selectable regions 452a-452d, each corresponding to one of the selection characters shown in first user interface 400 and associated with selectable options 402a-402d. Although four regions 452a-452d are shown in the example user interface 450 of FIG. 4B, more or fewer regions may be provided without departing from the invention. In some examples, a standard 10 key keypad may be displayed in the second interactive user interface. The standard keypad may also include additional options or characters, such as "enter," "cancel," "clear," or the like. In other examples, regions having various other characters (e.g., letters, punctuation, or the like), may be displayed. The number of regions and characters shown are merely some examples. Various other numbers of regions and characters may be used without departing from the invention.

With further reference to FIG. 3B, at step 310, the generated first interactive user interface and associated instruction or command for display may be transmitted from contactless processing computing platform 110 to entity computing system 1 120. For instance, the generated first interactive user interface and associated instruction may be transmitted during the communication session initiated upon establishing the first wireless connection. In other examples, an additional wireless connection and associated communication session may be established and initiated.

At step 311, the first interactive user interface and associated instruction may be received by the entity computing system 1 120.

Figure 3C:
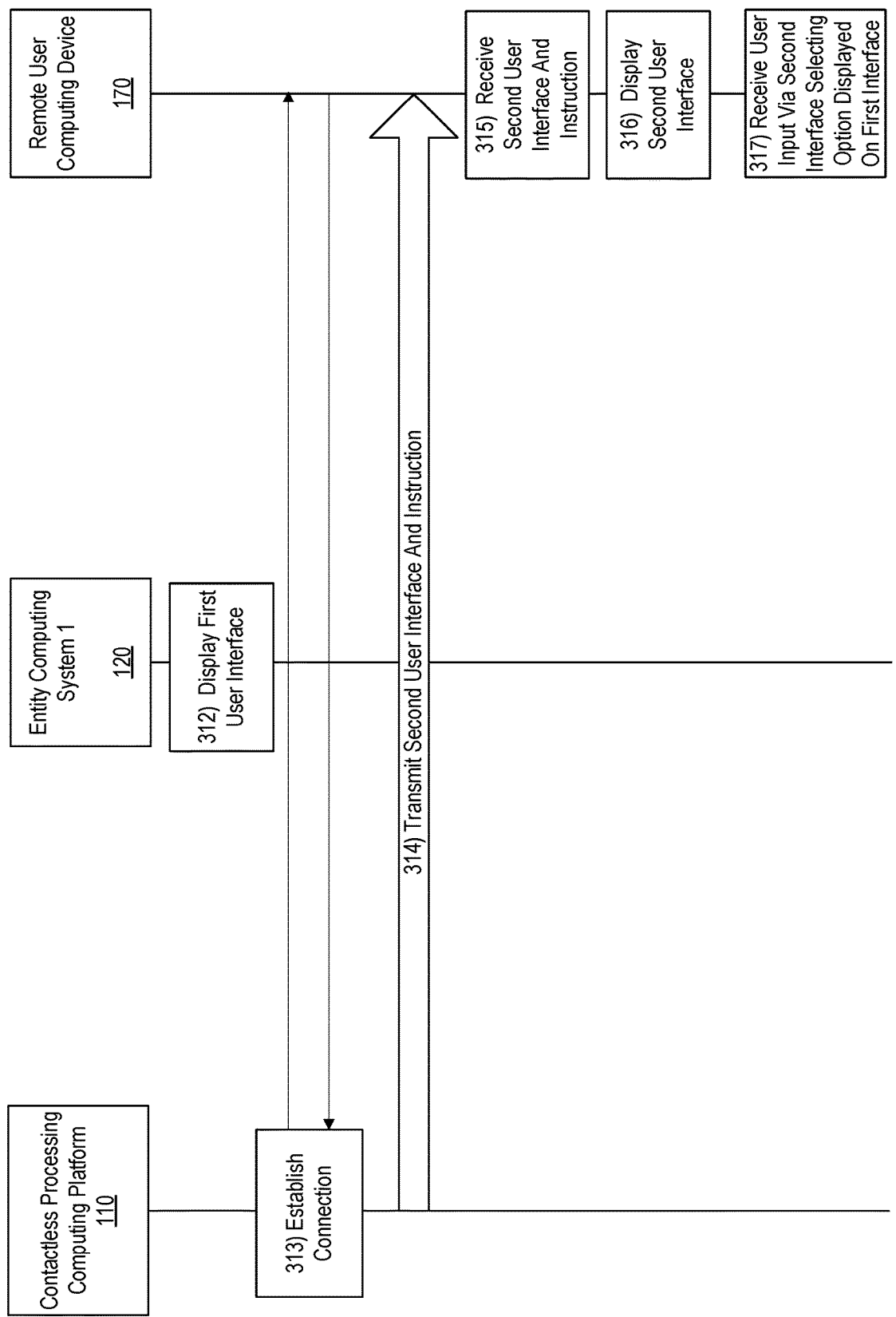

With reference to FIG. 3C, at step 312, the instruction or command to display the first interactive user interface may be executed and the first interactive user interface may be displayed or caused to be displayed on a display of entity computing system 1 120.

At step 313, a connection may be established between the contactless processing computing platform 110 and remote user computing device 170 (e.g., an event processing device 270). For instance, a second wireless connection may be established between the contactless processing computing platform 110 and remote user computing device 170. Upon establishing the second wireless connection, a communication session may be initiated between contactless processing computing platform 110 and remote user computing device.

At step 314, the generated second interactive user interface and associated instruction or command for display may be transmitted from contactless processing computing platform 110 to remote user computing device 170. For instance, the second interactive user interface and associated instruction or command may be transmitted during the communications session initiated upon establishing the second wireless connection.

At step 315, the second user interface and associated instruction or command may be received by remote user computing device 170. At step 316, the instruction or command to display the second interactive user interface may be executed and the second interactive user interface may be displayed or caused to be displayed on a display of remote user computing device 170.

At step 317, user input may be received via the second interactive user interface. The user input may include selection of one of the selection characters displayed by touching a region corresponding to the desired selection character on the second interactive user interface. For example, a user may view the first interactive user interface displayed on entity computing system 1 120 and may make a selection of one of the options available via the first interactive user interface by selecting a selection character corresponding to the desired option on via the second interactive user interface on remote user computing device 170. Accordingly, a user may select an option for functionality provided by entity computing system 1 120 without contacting (or with minimal contact with) the entity computing system 1 120.

With reference to FIG. 3D, at step 318, the user input data received via the remote user computing device 170 may be transmitted from remote user computing device to contactless processing computing platform 110. For instance, the user input data may be transmitted during the communication session initiated upon establishing the second wireless connection.

At step 319, the user input data may be received by the contactless processing computing platform 110 and processed. For instance, the user input data may be analyzed to identify a selection made and associated desired functionality to be provided by the entity computing system 1 120.

At step 320, based on the user input received, an instruction or command to execute functionality associated with the selected option may be generated. For instance, if a user has selected to withdraw $100, an instruction or command causing entity computing system 1 120 to dispense $100 may be generated. In another example, if the user has selected an option to display additional functionality and associated selectable options, one or more additional user interfaces may be generated, as well as an accompanying instruction or command to display the additional user interface(s) by the entity computing system 1 120.

At step 321, the generated instruction to execute functionality may be transmitted from contactless processing computing platform 110 to entity computing system 1 120. For instance, the instruction to execute selected functionality may be transmitted during the communication session initiated upon establishing the first wireless connection. In other examples, another wireless connection may be establishing and communication session initiated.

At step 322, the instruction to execute selected functionality may be received by entity computing system 1 120. At step 322, the instruction may be executed and the functionality may be provided to the user. Further, one or more user accounts and/or associated ledgers may be updated based on the executed functionality (e.g., amount withdrawn may be deducted from a user account).

FIG. 5 is a flow chart illustrating one example method of implementing contactless processing functions according to one or more aspects described herein. The processes illustrated in FIG. 5 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 500, registration data may be received from a user. For instance, a user may request to register for contactless transaction or event processing. In some examples, the registration information may include user identifying information (e.g., name, contact information, username, password, personal identification number (PIN), or the like), as well as data associated with an event processing device of the user (e.g., remote user computing device 170), such as account number, unique identifier, or the like. Registration data may also include user preferences, such as when and if to enable contactless processing. A user may request registration upon opening an account or after an account has been opened. In some examples, a user may request registration at a banking center, via a mobile banking application executing on a user computing device, via an online banking application, or the like.

At step 502, a request to access functionality of entity computing system 1 120, such as a self-service kiosk, may be received. For instance, a user may wave his or her event processing device (e.g., remote user computing device 170) near a sensor arranged on a self-service kiosk (e.g., entity computing system 170) to request access to functionality of the self-service kiosk. Additionally or alternatively, a user may swipe his or her event processing device through a card reader to request access or functionality. Further, a signal emitted from the event processing device, or other user computing device (e.g., remote user computing device 175) may be detected and may constitute a request to access functionality.

At step 504, authentication data may be received from the user requesting access to functionality of the entity computing system 1 120. For instance, authentication data such as username and password, PIN, biometric data, detection of a signal associated with a pre-registered device, or the like, may be received.

At step 506, user data may be retrieved from one or more databases. For instance, pre-stored user data may be retrieved. In some examples, the pre-stored user data may be retrieved by querying a database using data captured from, for instance, the request to access functionality, as inputs. For example, user or device identifying information may be retrieved from the event processing device, remote user computing device 175, or the like, and used to query a database to retrieve pre-stored data associated with the user, such as authentication data.

At step 508, the received authentication data may be compared to the retrieved, pre-stored authentication data. At step 510, a determination may be made, based on the comparing, as to whether the received authentication data matches the retrieved, pre-stored authentication data. If, at step 510, a match does not exist, a notification denying the request to access functionality may be generated and transmitted to a user device at step 512.

If, at step 510, a match does exist, contactless processing may be enabled at step 514. For instance, user preferences (e.g., received at registration) may be reviewed and, if selected, contactless processing functions may be enabled and/or activated.

At step 516, a connection may be established with the event processing device of the user (e.g., remote user computing device 170). In some examples, the connection may be directly between contactless processing computing platform 110 and the remote user computing device 170. Additionally or alternatively, the connection may be between contactless processing computing platform, entity computing system 1 120, and remote user computing device 170.

At step 518, first and second user interfaces may be generated and transmitted to their respective devices. For instance, as discussed herein, a first interactive user interface may be generated and transmitted for display by entity computing system 1 120, while a second, different interactive user interface may be generated and transmitted for display on event processing device (e.g., remote user computing device 170).

At step 520, user input may be received via the second interactive user interface displayed on the event processing device (e.g., remote user computing device 170). For instance, user input selecting (e.g. via touch) a region corresponding to a selection character associated with a desired functionality may be received. The input may be received by the event processing device and transmitted to the contactless processing computing platform 110.

At step 522, the received user input may be mapped to the corresponding selectable option displayed via the first interactive user interface displayed on entity computing system 1 120. At step 524, based on the mapping, an instruction or command causing execution of the desired or selected functionality may be executed, thereby causing the entity computing system 1 120 to perform the selected function.

As discussed, aspects described herein are directed to reducing or eliminating contact with one or more common surfaces, such as a screen or keypad at a self-service kiosk. By generating an interactive user interface that is displayed on a user's personal event processing the device, the user may make selections related to functionality of the self-service kiosk by selecting options from the event processing device, rather than by selecting options (e.g., touching) via the self-service kiosk itself.

In addition, arrangements discussed herein may reduce occurrences of unauthorized activity. Unauthorized actors may install a proxy keypad on self-service kiosk, which may then be used to facilitate unauthorized activity. By generating an interactive user interface that may mimic the keypad or selection options provided by the self-service kiosk, the user may bypass inputting selections via the self-service kiosk itself, thereby rendering the proxy keypad useless.

In some examples, contactless processing may be initiated upon detection of the user (e.g., prior to authentication) such that a user may provide authentication information via a user interface displayed on the user's event processing device. For instance, in some examples, a first user interface displayed on the self-service kiosk may include a request for authentication data, such as a PIN. A second interactive user interface including a simulated standard keypad (e.g., standard self-service kiosk keypad) or other selection options may be generated and displayed on event processing device. A user may input his or her PIN via the second interactive user interface, which may then be transmitted to the contactless processing computing platform 110 for authentication of the user. Accordingly, upon detecting the event processing device, a connection may be established with the event processing device to display the simulated keypad, which may then be used to input the user's PIN, select one or more options, or the like.

Although various aspects described herein relate to an interactive user interface displayed on an event processing device displaying selection characters corresponding to options displayed on a display of a self-service kiosk. However, in some examples, the user interface displayed on the self-service kiosk may also be displayed on the event processing device and a user may select a desired option from the simulated self-service kiosk display screen on the event processing device. Accordingly, a same user interface may be displayed on both the self-service kiosk and the event processing device and a user may select an option from either the self-service kiosk display or the event processing device display.

In one example arrangement, a user may approach an ATM to withdraw $200. The user may wave his or her event processing device near a sensor of the ATM to activate functionality of the ATM. In some examples, the user may provide additional authentication information to authenticate. Upon authentication, the user may be presented with a plurality of selectable options, each option including a corresponding selection character. For instance, the plurality of selectable options may include an option to withdraw $200 and an associated selection character "2." The user may then look at his or her event processing device and may touch or select character "2" as displayed on a display region of the event processing device. The user input may be transmitted to the self-service kiosk and the functionality associated with option 2 may be executed and $200 may be dispensed from the ATM.

Figure 6:
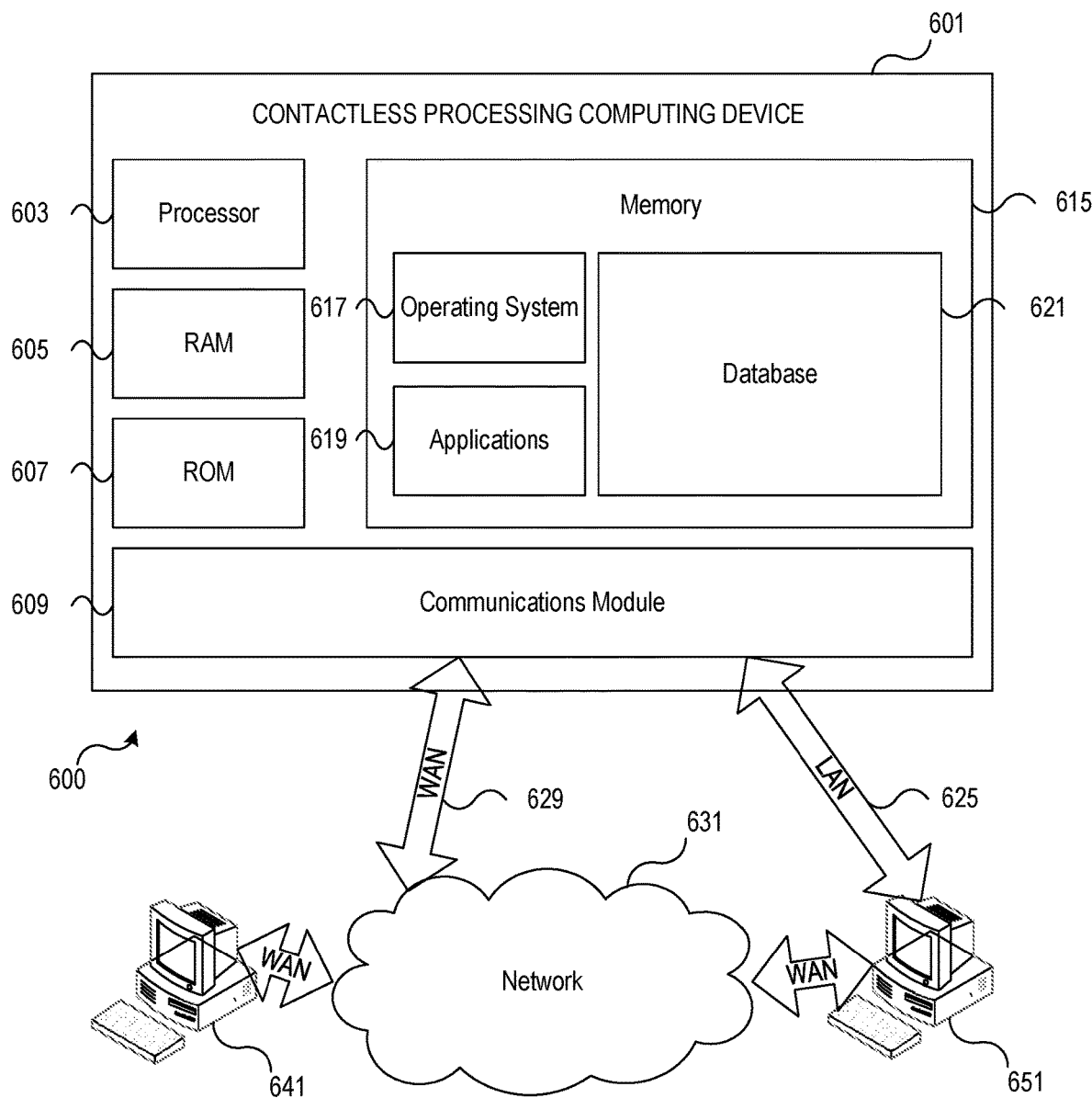
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include contactless processing computing device 601 having processor 603 for controlling overall operation of contactless processing computing device 601 and its associated components, including Random Access Memory (RAM) 605, Read-Only Memory (ROM) 607, communications module 609, and memory 615. Contactless processing computing device 601 may include a variety of computer readable media. Computer readable media may be any available media that may be accessed by contactless processing computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by contactless processing computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on contactless processing computing device 601. Such a processor may execute computer-executable instructions stored on a computer-readable medium.

Software may be stored within memory 615 and/or storage to provide instructions to processor 603 for enabling contactless processing computing device 601 to perform various functions as discussed herein. For example, memory 615 may store software used by contactless processing computing device 601, such as operating system 617, application programs 619, and associated database 621. Also, some or all of the computer executable instructions for contactless processing computing device 601 may be embodied in hardware or firmware. Although not shown, RAM 605 may include one or more applications representing the application data stored in RAM 605 while contactless processing computing device 601 is on and corresponding software applications (e.g., software tasks) are running on contactless processing computing device 601.

Communications module 609 may include a microphone, keypad, touch screen, and/or stylus through which a user of contactless processing computing device 601 may provide input, and may also include one or more of a speaker for providing audio output and a video display device for providing textual, audiovisual and/or graphical output. Computing system environment 600 may also include optical scanners (not shown).

Contactless processing computing device 601 may operate in a networked environment supporting connections to one or more remote computing devices, such as computing devices 641 and 651. Computing devices 641 and 651 may be personal computing devices or servers that include any or all of the elements described above relative to contactless processing computing device 601.

The network connections depicted in FIG. 6 may include Local Area Network (LAN) 625 and Wide Area Network (WAN) 629, as well as other networks. When used in a LAN networking environment, contactless processing computing device 601 may be connected to LAN 625 through a network interface or adapter in communications module 609. When used in a WAN networking environment, contactless processing computing device 601 may include a modem in communications module 609 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
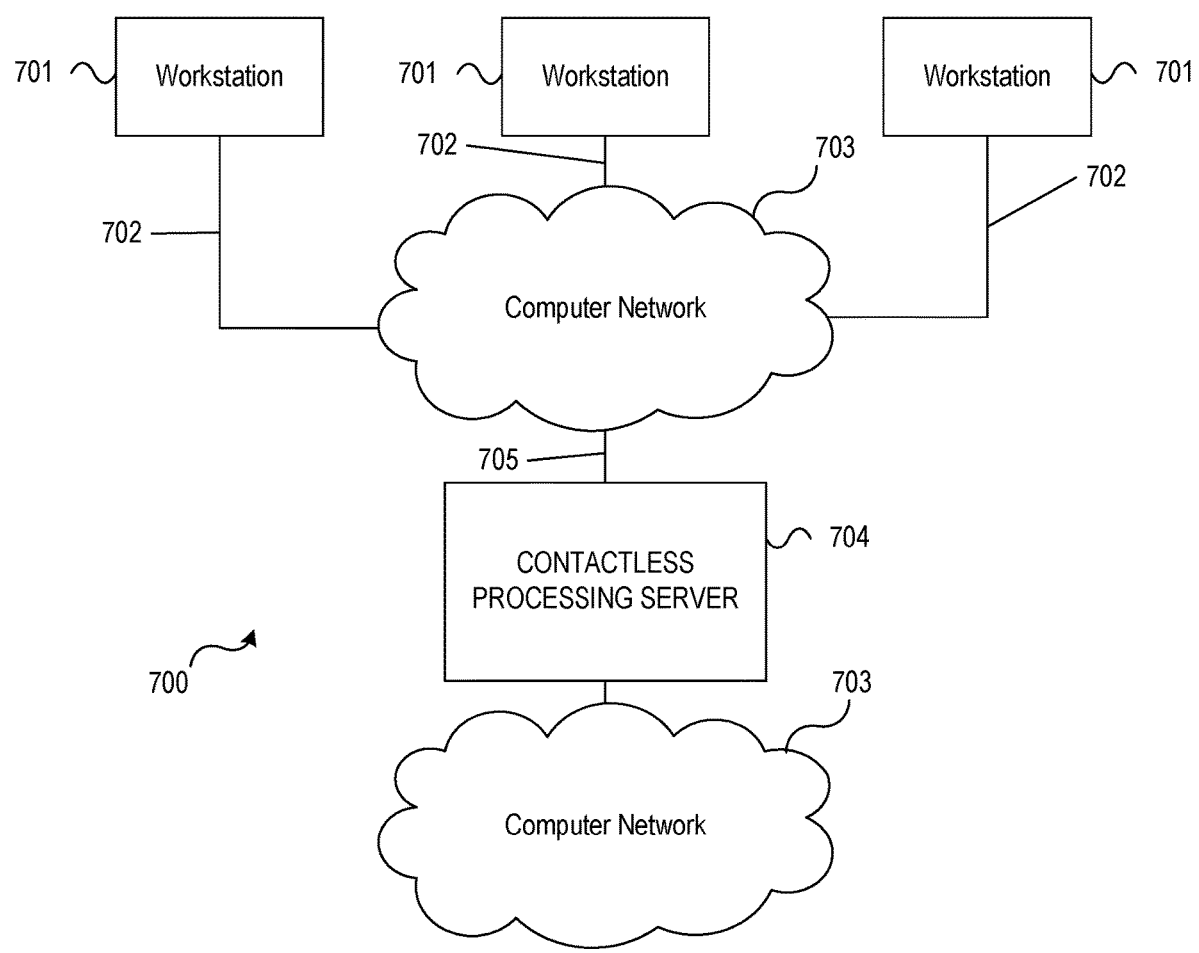
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to contactless processing server 704. In system 700, contactless processing server 704 may be a server, processor, computer, or data processing device, or combination of the same, configured to perform the functions and/or processes described herein. Server 704 may be used to receive a request to access functionality, receive authentication information, authenticate a user, generate and transmit interactive user interfaces, receive and process user input received via an interactive user interface, execute or cause to execute functionality of a self-service kiosk, or the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and contactless processing server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system, comprising:
an event processing device, including:
a generally planar surface having a first side and an opposite, second side;
a first processor arranged between the first side and the second side; and
a digital display arranged on one of the first side or the second side;
a self-service kiosk, including:
at least a second processor;
a communication interface communicatively coupled to the at least a second processor; and
a memory storing computer-readable instructions that, when executed by the at least a second processor, cause the self-service kiosk to:
receive a request to access functionality;
authenticate a user in response to receiving the request to access functionality;
generate a first interactive user interface including a plurality of selectable options and a selection character corresponding to each selectable option;
generate a second interactive user interface different from the first interactive user interface and including the selection characters corresponding to each selectable option;
display the first interactive user interface including the plurality of selectable options and the selection characters corresponding to each selectable option on a display of the self-service kiosk;
cause display of the second interactive user interface including the selection characters corresponding to each selectable option on the digital display of the event processing device;

receive user input selecting one selection character via the second interactive user interface;

map the received user input to the selectable option corresponding to the selected one selection character; and execute a function associated with the selectable option corresponding to the selected one selection character.

2. The system of claim 1, wherein the event processing device and the self-service kiosk are physically separate devices.

3. The system of claim 1, wherein the self-service kiosk includes an automated teller machine (ATM).

4. The system of claim 1, wherein the event processing device includes one of: a debit card or a credit card.

5. The system of claim 1, wherein the request to access functionality includes detecting a presence of the event processing device in proximity to the self-service kiosk.

6. The system of claim 1, wherein the selectable option corresponding to the selected one selection character includes a withdrawal of funds.

7. The system of claim 6, wherein executing the function associated with the selected option corresponding to the selected one selection character includes dispensing the funds from the self-service kiosk.

8. The system of claim 1, wherein the digital display is a touch-sensitive display.

9. A method, comprising:

receiving, by a self-service kiosk having at least a first processor and memory, a request to access functionality;

authenticating, by the at least a first processor, a user in response to receiving the request to access functionality;

generating, by the at least a first processor, a first interactive user interface including a plurality of selectable options and a selection character corresponding to each selectable option;

generating, by the at least a first processor, a second interactive user interface different from the first interactive user interface and including the selection characters corresponding to each selectable option;

displaying, by the at least a first processor and on a display of the self-service kiosk, the first interactive user interface including the plurality of selectable options and the selection characters corresponding to each selectable option;

causing, by the at least a first processor, display of the second interactive user interface including the selection characters corresponding to each selectable option on a digital display of an event processing device having a second processor and a digital display;

receiving, by the at least a first processor, user input selecting one selection character via the second interactive user interface;

mapping, by the at least a first processor, the received user input to the selectable option corresponding to the selected one selection character; and executing, by the at least a first processor, a function associated with the selectable option corresponding to the selected one selection character.

10. The method of claim 9, wherein the event processing device and the self-service kiosk are physically separate devices.

11. The method of claim 9, wherein the self-service kiosk includes an automated teller machine (ATM).

12. The method of claim 9, wherein the event processing device includes one of: a debit card or a credit card.

13. The method of claim 9, wherein the request to access functionality includes detecting a presence of the event processing device in proximity to the self-service kiosk.

14. The method of claim 9, wherein the selectable option corresponding to the selected one selection character includes a withdrawal of funds.

15. The method of claim 14, wherein executing the function associated with the selected option corresponding to the selected one selection character includes dispensing the funds from the self-service kiosk.

16. The method of claim 9, wherein the digital display is a touch-sensitive display.

17. One or more non-transitory computer-readable media storing instructions that, when executed by a computing platform comprising at least one processor, memory, and a communication interface, cause the computing platform to:

receive a request to access functionality;

authenticate a user in response to receiving the request to access functionality;

generate a first interactive user interface including a plurality of selectable options and a selection character corresponding to each selectable option;

generate a second interactive user interface different from the first interactive user interface and including the selection characters corresponding to each selectable option;

display the first interactive user interface including the plurality selectable options and the selection characters corresponding to each selectable option on a display of the computing platform;

cause display of the second interactive user interface including the selection characters corresponding to each selectable option on a digital display of an event processing device;

receive user input selecting one selection character via the second interactive user interface;

map the received user input to the selectable option corresponding to the selected one selection character; and execute a function associated with the selectable option corresponding to the selected one selection character.

18. The one or more non-transitory computer-readable media of claim 17, wherein the event processing device and the computing platform are physically separate devices.

19. The one or more non-transitory computer-readable media of claim 17, wherein the event processing device includes one of: a debit card or a credit card.

20. The one or more non-transitory computer-readable media of claim 17, wherein the request to access functionality includes detecting a presence of the event processing device in proximity to the computing platform.

21. The one or more non-transitory computer-readable media of claim 17, wherein the selectable option corresponding to the selected one selection character includes a withdrawal of funds.

22. The one or more non-transitory computer-readable media of claim 21, wherein executing the function associated with the selected option corresponding to the selected one selection character includes dispensing the funds from the computing platform.

23. The one or more non-transitory computer-readable media of claim 17, wherein the digital display is a touch-sensitive display.

* * * * *